April 7, 1931. W. K. SIMPSON 1,799,259
BLAST TRAP
Filed Sept. 25, 1928
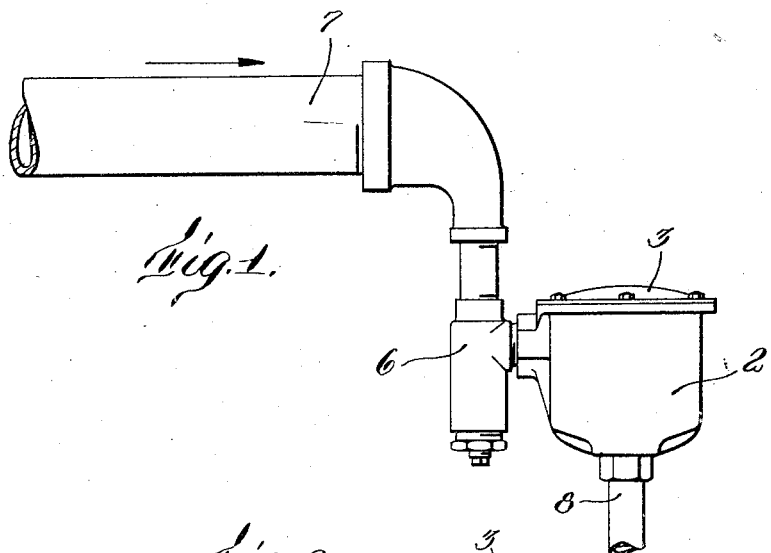
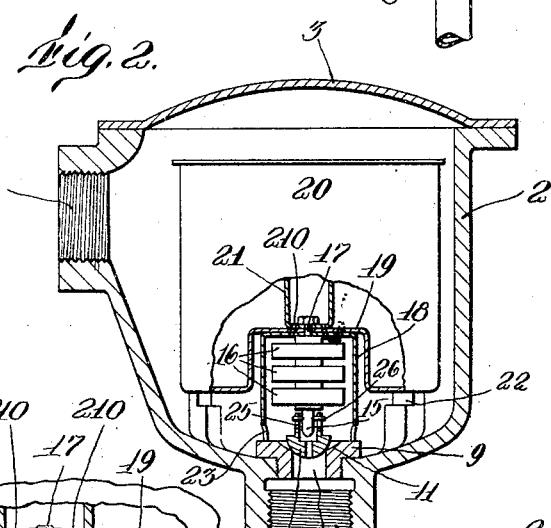
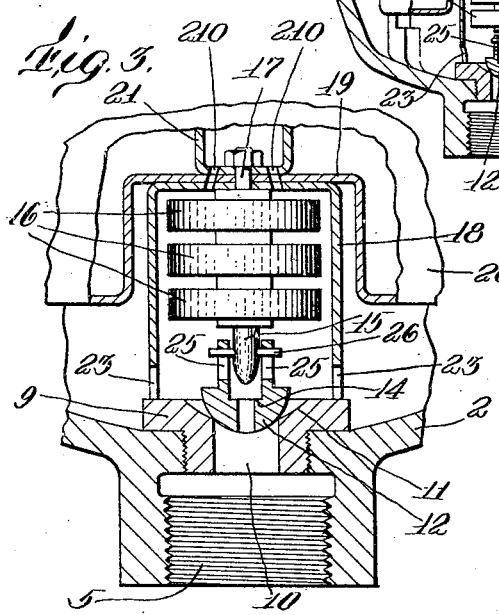
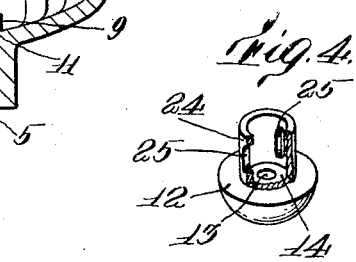
Inventor
William K. Simpson
by Wright, Brown, Quinby Hay
Attys.

Patented Apr. 7, 1931

1,799,259

UNITED STATES PATENT OFFICE

WILLIAM K. SIMPSON, OF WATERBURY, CONNECTICUT, ASSIGNOR TO HOFFMAN SPECIALTY COMPANY, OF WATERBURY, CONNECTICUT, A CORPORATION OF ILLINOIS

BLAST TRAP

Application filed September 25, 1928. Serial No. 308,271.

This invention relates to heavy duty steam traps of the type employing a float and thermostat in combination for controlling the discharge valve. Such traps, among other uses, have been applied to the purpose of relieving condensation from blast coils, which are steam pipes or coils exposed to a current of air delivered from a blower, and in which the condensation of steam is consequently very rapid and copious. For this reason such traps have been called blast traps in the trade, and I have adopted that same term for the title of this patent, but without intending thereby to indicate any limitation in the scope of the invention. The object of the invention is to furnish the trap with means enabling it to discharge water of condensation under steam pressures of magnitudes which, in the traps of this character heretofore produced, have prevented opening of the discharge valve; and otherwise to obtain improved action, as later described.

The invention consists in the improvements described in the following specification, with reference to the drawings, and in all other constructions equivalent thereto.

The drawings illustrate the preferred embodiment of this invention, and therein,—

Fig. 1 is an elevation showing a steam trap embodying this invention applied to the end of a pipe line;

Fig. 2 is a sectional view of the trap illustrating the preferred form of the parts in which the present improvement is embodied;

Fig. 3 is a fragmentary sectional view on an enlarged scale showing the valve proper of the trap and its connection with the thermostat;

Fig. 4 is a perspective view, partly broken away, of the main valve proper of the trap.

Like reference characters designate the same parts wherever they occur in all the figures.

The trap comprises a bowl or casing 2 having a detachable cover 3 with an inlet 4 at the side, and an outlet 5 at the bottom. Fig. 1 shows the trap in connection, through a fitting 6 containing a strainer, with a steam pipe 7 and a drain pipe 8.

Within the trap is a removable and renewable valve seat plug 9 screwed into the outlet orifice and having a port 10 surrounded by a valve seat 11.

12 is the main valve proper which is adapted to close on the valve seat 11 and is preferably of spherical formation, while the valve seat is a narrow edge, in order that the valve may easily and tightly seat itself even though not accurately alined with the axis of the port. Said valve proper is formed with a central passageway or port 13, the rim 14 of the upper orifice of which also constitutes a valve seat to cooperate with a second valve 15.

Valve 15 is carried by a thermostat which, in this instance, consists of a number of connected drums or boxes 16 containing a volatile fluid and having flexible end walls, to the lowermost one of which the valve 15 is connected, and the uppermost one of which is connected to a threaded stem 17. Said stem passes through one end of a cage 18, through the inwardly offset bottom 19 of a float 20, and through the lower end wall of a tube or thimble 21 which extends from said bottom wall 19 through the float and is open at its upper end to admit the steam or air which may be contained in the trap body or bowl. Ports 210 extend through the contiguous walls of thimble, float and cage to permit circulation of steam and air through the space containing the thermostat. The float in this instance is of hollow sheet metal construction comprising, besides the bottom wall previously mentioned, cylindrical side walls and a top wall; all the walls being hermetically joined together. However, it may be made of other material and in other constructions. It is guided by longitudinal ribs 22 projecting inward from the side walls of the bowl or outer casing.

The cage 18 is adapted to rest at its lowest end on the upper surface of the valve seat plug when the float is lowered, and has ports 23 in its sides for passage of steam, air and water.

The valve proper 12 likewise has a sleeve portion 24 surrounding the orifice to the port or passage 13 and adapted to surround loosely the second valve 15, with clearance around the latter for passage of air and water. In the opposite sides of the sleeve 24 are slots 25 occupied by the ends of a pin 26 which passes through the second valve 15 and is held tightly therein. In conjunction with the slots 25 the pin provides a lost motion connection between the second valve 15 and main valve 12.

The expansive and contractile motion of the thermostat 16 is such that when expanded at the temperature of live steam the valve 15 seats against the seat 14 if the cage 18 at the same time rests on the valve seat plug 9, the main valve proper 12 being then seated on the seat 11; and the contraction of the thermostat during a temperature drop of 14° or thereabouts is made a desired relatively large amount, preferably 1/8″. Preferably the lost motion between the valves 15 and 14 is made equal to the full travel of the thermostat during the given temperature range, or whatever other temperature range may be determined upon.

The trap operates as follows: When the steam is first turned on, the trap and the pipe to which it is connected being cold, the parts are in the position shown in Figs. 2 and 3; the cage 18 resting on the valve plug, valve proper 12 being closed and valve 15 open. Any air or water which is in the system and is at a temperature below that of live steam may then flow freely past valve 15 and through ports 13 and 10. When live steam arrives at the thermostat, the latter is expanded and valve 15 is seated. Water of condensation thereafter accumulating opens the valve 15, by contraction of the thermostat, in proportion as its temperature is below the temperature which closes this valve, until the limit of contraction is reached. But if at any stage in the contraction of the thermostat the accumulation of water is faster than the discharge capacity of port 13, or the annular space between valve 15 and seat 14 when the valve is only partly open, the water eventually raises float 20, which first withdraws valve 15 to the limit of the lost motion between the two valves, and then unseats valve 12 and opens port 10, which is much larger than port 13.

The improvement herein described of lost motion between the two valves sufficient to absorb all the expansion and contraction of the thermostat within the range of working temperatures, obtains a better, more rapid and more efficient discharge of water than has been obtained heretofore with traps of this type. A great increase in capacity for discharge past the second valve when the trap is working thermostatically is obtained; while when the valve is operated by the float, the main valve will be opened by the sudden entrance of a quantity of water into the trap even though the closing pressure of steam on the valve is greater than the buoyant lifting power of the float. This latter effect seems to be due to the fact that the lost motion gives opportunity for the float, when raised by rapid inflow of water, to acquire momentum so that, when the pin 26 strikes the upper end of the slots 25, it does so with impact sufficient to dislodge the main valve from its seat.

What I claim and desire to secure by Letters Patent is:

1. A steam trap comprising two halves having a lost motion connection between them, one of said valves having a passage through it accessible to water entering the trap and adapted to be opened and closed by the other valve, an expansible thermostat to which the last mentioned valve is connected, a float carrying said thermostat, a casing in which said float is contained, said casing having an outlet with which the first of the above named valves cooperates, and means for supporting the thermostat in position for thermostatic operation of said valves when the trap is substantially empty of water.

2. A steam trap comprising a casing having an outlet in its lower part, a main valve arranged to seat over said outlet and having a port communicating with the outlet accessible to the water entering the trap casing when the main valve is closed, a float, an expansible fluid thermostat connected to the float bottom, a second valve carried by the lower end of said thermostat adapted to open and close the port in said main valve, stop means arranged to arrest descent of the float and thermostat, and a lost motion connection between the two valves having a range of motion substantially equal to the range of expansion and contraction of the thermostat.

3. A steam trap comprising a casing having an outlet in its bottom, a float adapted to rise and descend in said casing, an expansible fluid thermostat carried by the float bottom, a main valve arranged to seat over said outlet and having a port opening into the outlet and of substantially smaller area than the same, a second valve secured to the thermostat arranged to close and open the port in the main valve, and a lost motion connection between the two valves, said connection providing for lost motion substantially equal to the full range of movement given to the second valve by the thermostat, and stop means arranged to arrest descent of the float and thermostat in such position that, when the thermostat is fully contracted the second valve is approximately at the upper limit of said lost motion.

4. A steam trap comprising a casing having an outlet in its bottom, a float therein, a thermostat connected to the float bottom, a valve carried by said thermostat projecting toward said outlet, and stop means arranged to arrest the descent of the float and thermostat in a position such that extension of the thermostat by the temperature of live steam will cause seating of the valve, and contraction of the thermostat by lower temperatures will cause unseating of the valve.

5. A steam trap comprising a casing having an outlet port, a normally closed main valve for said port, a normally open second valve controlling a smaller discharge port, and being movable independently of the main valve, a thermostat connected to the second valve for operating it, a float connected to said thermostat, providing an abutment for the latter in closing the second valve and adapted to lift the thermostat when raised by flotation, and a lost motion connection between the thermostat and main valve adapted to open the latter when the float is so lifted.

6. A steam trap comprising a casing having an outlet in its lower part, a float contained freely in said casing, a valve for opening and closing said outlet, and a lost motion connection between the float and valve arranged to permit a limited amount of movement of the float vertically independently of the valve.

7. A steam trap comprising a casing having a bottom outlet, a valve for closing and opening said outlet, in cooperation with a seat surrounding the outlet, accessible to water accumulating in the trap casing, a float in the casing, a thermostat carrying said valve and carried by the float in a position where it is accessible for direct heat transfer to and from water, air, and steam in the trap, and means independent of said seat for supporting the float where it holds said valve away from said seat when the thermostat is contracted.

8. A steam trap comprising a casing havan inlet in its upper part and a bottom outlet, a valve for closing and opening said outlet accessible to water accumulating in the trap casing, disconnected from the walls thereof and situated, as to its lower part, below said inlet, a float in the casing, and a thermostat carrying said valve and carried by the float at a low level where it is directly accessible to water in the bottom of the trap, the float having a substantially vertical through passage arranged for flow of air and steam through it past the thermostat.

In testimony whereof I have affixed my signature.

WILLIAM K. SIMPSON.